United States Patent
Löffler et al.

(10) Patent No.: US 7,429,012 B2
(45) Date of Patent: Sep. 30, 2008

(54) HIGH PERFORMANCE TIGHTENER

(75) Inventors: Kay Löffler, Pinneberg (DE); Michael Pech, Hamburg (DE); Martin Schmidt, Elmshorn (DE); Thomas Schmidt, Timmendorfer Strand (DE); Thomas Schneider, Husum (DE); Stefan Suhr, Elmshorn (DE); Stefan Bösch, Revenahe (DE)

(73) Assignee: Autoliv Development AB (DE)

( * ) Notice: Subject to any disclaimer, the term of this patent is extended or adjusted under 35 U.S.C. 154(b) by 318 days.

(21) Appl. No.: 10/516,033

(22) PCT Filed: Mar. 28, 2003

(86) PCT No.: PCT/EP03/03271

§ 371 (c)(1),
(2), (4) Date: Jan. 10, 2005

(87) PCT Pub. No.: WO03/082640

PCT Pub. Date: Oct. 9, 2003

(65) Prior Publication Data

US 2005/0178870 A1    Aug. 18, 2005

(30) Foreign Application Priority Data

Mar. 28, 2002   (DE) ................................ 102 13 906

(51) Int. Cl.
  *B65H 75/48*  (2006.01)
  *B60R 22/46*  (2006.01)
(52) U.S. Cl. ........................ 242/374; 280/807; 280/806; 297/475
(58) Field of Classification Search ................ 242/374; 280/805, 806, 807; 297/475
  See application file for complete search history.

(56) References Cited

U.S. PATENT DOCUMENTS

| 4,455,000 | A |   | 6/1984  | Nilsson |
|-----------|---|---|---------|---------|
| 4,545,546 | A | * | 10/1985 | Kawaguchi et al. .......... 242/372 |
| 4,618,108 | A |   | 10/1986 | Butenop et al. |
| 5,487,515 | A | * | 1/1996  | Hishon et al. ............ 242/383.4 |
| 6,131,843 | A |   | 10/2000 | Singer et al. |
| 6,405,959 | B1 |  | 6/2002  | Klingauf et al. |
| 6,419,176 | B1 | * | 7/2002  | Mizuno ....................... 242/374 |
| 2001/0017330 | A1 | * | 8/2001 | Fujii et al. ............... 242/390.8 |
| 2002/0017584 | A1 | * | 2/2002 | Specht .................... 242/390.9 |

FOREIGN PATENT DOCUMENTS

| DE | 43 31 027  | 3/1995 |
| DE | 196 02 549 | 8/1996 |

* cited by examiner

*Primary Examiner*—Peter M. Cuomo
*Assistant Examiner*—Stefan Kruer
(74) *Attorney, Agent, or Firm*—Robert W. Becker; Robert W. Becker & Associates

(57) ABSTRACT

A self stopping seat belt retractor is provided with a belt shaft for winding a seat belt thereonto and unwinding a wound seat belt therefrom and a housing rotatably supporting the belt shaft and having a locking device that includes a locking means for the belt shaft that can be controlled in a vehicle sensitive and/or belt sensitive manner into engagement with a toothed gearing system on that side of the housing. A tightening device operating on the belt shaft includes a drive wheel, which is, prior to the release of the tightening device, secured in a force-transmitting manner on the housing, is connectable upon release of the tightening device with the belt shaft, whereby the drive wheel of the tightening device is connectable via the locking device with the belt shaft for the transmission of force to the belt shaft.

33 Claims, 11 Drawing Sheets

HIGH PERFORMANCE TIGHTENER

BACKGROUND OF THE INVENTION

The invention relates to a self stopping or locking seat belt retractor with a housing having a blocking device that includes at least one blocking means for the belt shaft that can be controlled in a vehicle sensitive and/or belt sensitive manner into engagement with a toothed gearing system on the side of the housing, and a tightening device operating on the belt shaft comprising a drive wheel that can be set into rotation via a drive device, the drive wheel being connectable upon release of the tightening device with the belt shaft, whereby the drive wheel of the tightening device is connectable via the blocking device with the belt shaft for the transmission of force to the belt shaft and the drive wheel is, prior to the release of the tightening device, secured in a force-transmitting manner on the housing of the seat belt retractor.

A self stopping seat belt retractor with the above-noted features is described in EP 0 093 233. A rotation blade is provided to function as a drive wheel, the rotation blade being impinged by a gas stream introduced thereonto and being connected with a ring rotatably supported in a seat belt retractor housing. Pivotable bolts are arranged on the one side of the ring, the bolts being controllable into engagement with outer toothed lever gears fixedly secured to the belt shaft of the seat belt retractor so that, upon release of the tightening device, the rotatable ring drives the belt shaft via the bolts that have been controlled into engagement with the lever gear. At the same time, the ring is a component of a rotatably arranged housing and this ring is, during normal operation of the seat belt retractor without release of the tightening device, fixedly secured to the housing via a return movement stop, which is effective for stopping movement in the belt unwinding direction, that is in the form of stop levers engaging the housing. Upon blocking of the rotation of the belt shaft in the belt unwinding direction performed as a result of tasking by the belt-sensitive and/or vehicle-sensitive control system, the bolts between the ring and the lever gear are coupled to a control disk that is a component of the belt-sensitive/vehicle-sensitive control system, so that, upon tasking by the control system, the bolts disposed on the ring are controlled into engagement with the lever gear. In this manner the belt shaft is blocked in its rotational movement, whereby a loading on the belt shaft in the belt unwinding direction is diverted, via the belt shaft, the lever gear, the belt, and the ring with the housing, into the supporting housing of the seat belt retractor.

The state of the art seat belt retractor thus puts into effect the principle that the vehicle-sensitive and/or belt-sensitive controlled blocking device that is available in any event is now drawn into performing the additional function of, as well, coupling the drive wheel of the tightening device to the belt shaft for the tightening operation.

The invention provides a solution to the challenge of improving the functioning principle of a seat belt retractor having the state of the art features.

SUMMARY OF THE INVENTION

The invention provides in its core concept that the drive wheel comprises an inner toothed gearing system oriented for engagement by the blocking means of the blocking device secured on the belt shaft and thereby operates as a blocking toothed gearing system, and that the ring-shaped drive wheel comprises, in addition to the inner toothed gearing system, an outer toothed gearing system for engagement with at least one block lever on the housing that is maintained, via yielding under the bias of a spring, in engagement with the outer toothed gearing system, whereby, via the rotation of the drive wheel that is effected by the release of the tightening device, the drive wheel is releasable from the housing and is connectable with the belt shaft in a force-transmitting manner via the blocking means of the blocking device.

With this solution, the drive wheel of the tightening device is allocated the further function of a house-secured toothed gearing system for the blocking event of the seat belt retractor during its normal operation involving no tasking by the tightening device, insofar as the drive wheel comprises an inner toothed gearing system for engagement of the stop lever that is disposed in a conventional manner on the belt shaft. In this connection, the drive wheel is arranged in a non-rotating disposition relative to the housing of the seat belt retractor in the belt retracting direction so that, via the engagement of the blocking means disposed on the belt shaft in the inside to other gearing system of the drive wheel, the blocking force stemming from the belt shaft is conducted to the seat belt retractor housing via the blocking means and the drive wheel. In this connection, there is, in addition to the inner toothed gearing system of the drive wheel, an outer toothed gearing system for engagement with an additional block lever fixedly secured to the housing. At the same time, the drive wheel is arranged to be rotatable in the belt unwinding direction so that, upon tasking by the tightening device via the rotation of the drive wheel as such is effected via the controlled blocking means, the belt shaft is rotated as well in the belt unwinding direction.

In this connection, in accordance with an embodiment of the invention, it is provided that the blocking toothed gearing system of the drive wheel and the block lever are arranged relative to one another such that a rotation of the drive wheel in the belt retracting direction is constantly blocked and a rotation of the drive wheel in the belt unwinding direction is possible via an over-ratcheting of the block lever by means of the blocking toothed gearing system of the drive wheel.

In a first embodiment of the invention, it is provided that the drive wheel is directly connectable in a force-transmitting manner with the belt shaft via the blocking means arranged on the blocking device so that the blocking means acts in a double function in normal operation of the seat belt retractor as it does in a tightening operation.

Alternatively, it can be provided that the blocking device for the belt shaft comprises, in addition to the blocking means effective for blocking the belt, a lever, mounted on the blocking device and capable of being activated by the drive wheel, for de-coupling the drive wheel on the blocking device. In this event, separate levers can be provided that carry out in separated manner the blocking function and the coupling function. This permits a customized arrangement of the levers.

In accordance with a first embodiment of the invention, it is provided that the block link is arranged laterally adjacent the U-shank of the housing and is pivotably mounted on the U-shank under a pre-tension effected via a rotation spring.

In an expedient embodiment of the invention, it can, however, alternatively be provided that the block lever is arranged in the plane of the U-shank in a recess arranged in the shank and is pivotably mounted in the recess, whereby a leaf spring is arranged between the block lever and the edge of the recess. In this respect, a particularly space-saving configuration of the inventive seat belt retractor is connected therewith.

For equal load distribution, more block links can be disposed on the housing of the seat belt retractor around the circumference of the drive wheel. In this connection, a variation can be provided that the block levers are arranged on the drive wheel and a house-secured toothed gearing system is configured as a blocking toothed gearing system on the housing.

To the extent that, with respect to the drive wheel, both a blocking toothed gearing system for securing the drive wheel on the housing shank and, as well, the inside toothed gearing system for coupling to the belt shaft, are to be provided, it is provided that, in accordance with a first embodiment of the invention, the blocking toothed gearing system, which is configured as an outside toothed gearing system, and the inside toothed gearing system of the drive wheel are arranged in a plane. To the extent, as events may have it, that there is a space-saving arrangement of the toothed gearing systems already involved, there is produced a particular production advantage if, in accordance with an embodiment of the invention, the outside toothed gearing system are, via forming of the teeth of the inside toothed gearing system out of the ring profile of the drive wheel, configured in a manner such that the outside toothed gearing system and the inside toothed gearing system form a toothed gearing system with unitary teeth.

In an alternative embodiment, it can be provided that the blocking toothed gearing system, which is configured as an inside toothed gearing system, and the associated inside toothed gearing system of the drive wheel are arranged axially adjacent one another on the interior side of the ring profile of the drive wheel, whereby the block lever, which is disposed in a secure manner in the house, is configured in a U-shaped manner for engagement with the inside blocking toothed gearing system and, as a consequence thereof, grips the drive wheel from a position outward thereof.

In accordance with an embodiment of the invention, it is also provided, in accordance with a different construction principle, to lay out the drive wheel such that the drive wheel is operated in different ways before the tasking by the tightening device and after the tasking by the tightening device such that the quasi-house secured blocking toothed gearing system can operate as the belt shaft block. In this connection, it is provided, in accordance with an embodiment of the invention, that the drive wheel is secured on the housing via a blocking means that is capable of being destroyed when subjected to loading and the drive device of the tightening device is configured such that, after the conclusion of the drive movement, a return movement of the drive device in the belt unwinding direction is foreclosed such that the drive wheel is held in a non-rotating position via the blocked drive device and functions as the blocking toothed gearing system.

While the drive wheel, which is, for example, configured as a correspondingly arranged shear pin before the release of the tightening device, functions as an abutment for the engagement of the stop links arranged on the profile head of the belt shaft during normal operation of the seat belt retractor, the drive wheel, which is configured via suitable and known measures against a return rotation in the belt unwinding direction after the conclusion of the tightening operation, is itself so configured with respect to the blocking of the drive device that the drive wheel can receive the blocking force in the bolt unwinding direction transmitted by the belt shaft.

To the extent, for example, as has been described in connection with the embodiments of the invention described hereinabove, that the drive device of the tightening device is configured as a known belt tightener as described in DE 196 02 549 A1, it can be provided in order to fixedly secure the drive wheel, that there is a blocking of the balls or, respectively, the drive body, in the drive channel effected via suitable pinching securement of the balls. To the extent that the drive device is configured, for example, as a cable tightener, measures for securing the drive cable by means of suitable drive clamps or return movement stops are available.

However, it can also be provided that the drive device itself is put into operation for the securement of the drive wheel and, as well, for the release of the tightening device, in lieu of the noted sheer pin, in that, for example, the balls or, respectively, the drive body, are arranged on the drive wheel in a blocking manner such that, upon impingement of the drive device in the tightening direction, a rotation of the drive wheel is possible while, however, a counter rotation—namely, in the belt unwinding directions—is not possible.

Since, before tasking by the tightening device, the coupling of the belt shaft with the drive wheel for the purpose of blocking the mechanism is effected by the seat belt retractor-side sensor and this coupling is also necessary for the transmission of the tightening movement, it is provided, in accordance with an embodiment of the invention, that there is a control element that is released by the tightening device for coupling the blocking means of the blocking device to the drive wheel. Via the control element, which is released via the tightening device, the blocking means is coupled with the drive wheel as is the case with respect to the belt blocking, so that a load transmitting connection between the drive wheel and the belt shaft occurs and, via this load transmitting connection, the tightening movement from the tightening device is transferred, as well, to the belt shaft. In this connection, the advantage is associated therewith that, after the thus-produced coupling, the control element is not loaded during the tightening process because, as is the case of a blocking event, the load transfer is directly between the drive wheel and the belt shaft. To the extent in the state of the art that there is typically a coupling required during the entire tightening process for transmitting force between the drive wheel and the belt shaft, such a coupling is no longer needed in connection with the inventive solution.

In view of the configuration of the sensors, it can be provided in a conventional manner that an inertial mass engaging around the blocking device is provided for belt sensitive control of the blocking means, the relative movement of the inertial mass with respect to the rotational movement of the blocking device controlling the blocking means in engagement with the drive wheel, whereby an outer toothed gearing system can be provided for the inertial mass as a blocking toothed gearing system with which, during the normal operation of the seat belt retractor, the sensor lever of a vehicle sensitive sensor can be brought into engagement. If, therefore, the rotation of the inertial mass remains behind the rotation of the belt shaft by reason of a too rapid belt unwinding or if the rotational movement of the inertial mass is constrained by the vehicle sensitive sensor, then the relative movement that occurs between the inertial mass and the belt shaft is converted into controlling the block lever, which is disposed on the profile head, into engagement with the inside toothed gearing system of the drive wheel, whereby the load transferring connection between the belt shaft and the drive wheel is produced.

To the extent that the belt shaft and the drive wheel are to be coupled to one another via controlling of the stop levers disposed on the profile head, various embodiments are provided for the control of the stop levers via an additional coupling lever that can be controlled into engagement with the outside toothed gearing system of the inertial mass, which can then initiate the corresponding relative movement of the inertial mass with respect to the belt shaft.

In accordance with a first embodiment of the invention, is provided that the coupling lever is, upon release of the tightening device by means of a special lever actuation, controllable into engagement with the blocking toothed gearing system of the inertial mass.

In this connection, it can be provided that the lever actuation is configured as a moveable actuator that moves the coupling lever, whereby this actuator can be an electro-magnet or a piezo element or another suitable drive element.

Alternatively, it is provided that the actuator for actuating the coupling lever is a pyrotechnically driven piston unit, whereby, to effect actuation of the piston unit, a special pyrotechnic drive unit can be provided; alternatively, it is also possible to connect the piston unit to the pyrotechnic drive device of the tightening device so that the piston unit, in order to actuate the coupling lever, can be impinged by the drive device of the tightening device.

Also, further special pressure-controlled drive means can be considered such as hydraulic drive possibilities, the production of a drive medium by means of a burning down of a detonating fuse, additional Bowden cable actuators or actuators via a lever linkage as well as actuators with an expanding pressure body such as are blown up by air or similar means.

In a further embodiment of the invention that is no longer based upon an inertial mass gripping around the blocking device, it is provided that the control element is a come-along lever that is disposed on the drive wheel and is controlled to respond to a housing component, the come-along lever, upon rotation of the drive wheel, being controlled into engagement with the blocking toothed gearing system of an inertially-controlled control disk operating as the blocking means and coming out of engagement with the control disk in connection with the blocking, as effected by the control disk, of the blocking means with the drive wheel. It is further provided that the control disk is arranged on a projection of the belt shaft on the outer side of a housing cap that grips around the drive wheel and that the housing cap is configured as a slide guide for the constrained guiding of the come-along lever that protects through the housing cap, whereby it is provided that the slide guide is so configured that the come-along lever, upon conclusion of the control of the block lever into engagement with the inner toothed gearing system of the drive wheel that is effected via the rotation of the control disk relative to the profile head, is sheared off.

In accordance with a further embodiment of the invention, it is provided that the control element is a lever that can be rotatably swung out from a come along lever that extends into a pot-shaped inertial mass and is connected with the drive wheel, the lever being controllable into engagement with an inner toothed gearing system configured on the inside of the cap-shaped inertial mass. In this manner, it can be provided that the lever is pivotably disposed on a spring element secured on the come-along piece, whereby the spring element comprises at least one spring arm that secures the lever in its inactive position. The spring lever thus determines the tasking level in accordance with which, due to the reason of the rotation of the drive wheel and the therewith connected come along piece the lever is controlled into engagement with the inner toothed gearing system of the inertial mass, so that the inertial mass is set into rotation; since, at the same time, upon release of the tightening device, the belt shaft is stationary or, in any event, rotates very slowly, such an event leads to a relative movement between the inertial mass and the belt shaft so that the blocking means of the blocking device is controlled into engagement with the inner toothed gearing system of the drive wheel, as a consequence of which the direct load transferring connection between the drive wheel and the belt shaft is produced.

In view of the connection of the drive wheel with the inertial mass, which is, in this embodiment, again configured as cap-shaped, and the inside toothed gearing system thus configured thereon, a simplification of the coupling configuration is provided for in that the control element is configured as a coupling member that is controllable by the drive device of the tightening device to begin its drive movement in an inner toothed gearing system on the inside of the cap-shaped inertial mass, whereby this coupling member is comprised of a rod that is arranged to be longitudinally displaceable on the drive wheel by means of the operation of the drive device, the rod extending, during its longitudinal displacement, into engagement with the inner toothed gearing system of the inertial mass.

In accordance with an embodiment of the invention, it is provided that the drive wheel is arranged with its outer toothed gearing system on the outside of a shank or leg of a U-shaped housing of a seat belt retractor and the block lever is disposed on the outside of the shank.

Alternatively, it can be provided that the drive wheel is arranged with its region that engages the drive device outside the U-shaped housing of the seat belt retractor on the outside of the shank and extends with an outer teeth-supporting flange through a support opening in the shank of the housing, whereby the block lever is disposed on the inside of the shank. In this manner, in an expedient way, the extension of the drive wheel that extends through the shank of the housing forms the rotational support for the rotation of the drive wheel.

The invention comprises, however, other different space arrangements for the function of the important construction elements.

The invention is, in particular, also deployable for the type of seat belt retractors with a force-limiting device configured as a torsion bar, such type being known, for example, from DE 43 31 027 A1. Also, in this seat belt retractor-belt tightening device combination the vehicle sensitive and/or belt sensitive-controlled blocking devices for the belt shaft and the coupling between the belt shaft and the drive wheel of the tightening device are arranged on different sides of the seat belt retractor housing. In such seat belt retractor-belt tightening device combinations provided with a torsion bar, the additional problem occurs that, following the conclusion of the tightening movement that is effective in the belt unwinding direction, in order to carry out a force limitation, a rotation of the belt shaft in the belt retracting direction is required and this is burdened or limited via the drive of the tightening device or, occasionally, can even be blocked thereby. In this connection, DE 43 31 027 A1 suggests, additionally, an expensive and complicated device for de-coupling the drive wheel from the belt shaft after the conclusion of the tightening movement. With the deployment of the basic concept of the invention in such seat belt retractor-belt tightening device combinations with force limitation, the additional advantage is associated therewith that the force limitation is not hindered after the conclusion of the tightening movement.

Insofar that the invention provides, in one embodiment, that the torsion bar comprises a profile head that supports the blocking means and is gripped around by the inertial mass, it can be provided, in an expedient way in accordance with an embodiment of the invention, that the profile head is connected with the belt shaft via shear pins as this basic concept is known from DE 195 28 115 A1. In this respect, the movement of the belt shaft, during both normal unwinding and winding in of the belt as well as upon tasking by the tightening device, is transferred, via bridging over of the torsion bar, directly to the profile head. After the conclusion of a tightening movement, there occurs, in association with corresponding unwinding loading on the belt shaft during an accident event, a breakage of the shear pins so that the belt shaft can now further rotate, due to the twisting of the torsion bar relative to the blocked profile head. In this manner, the advantage arises that, during the force limitation process, a connection between the belt shaft and the tightening device no longer exists so that, to this extent, as well, the limitations on the force limiting movement of the belt shaft present in the state of the art do not occur.

BRIEF DESCRIPTION OF THE DRAWINGS

Embodiments of the invention are further set forth in the drawings that are hereinafter described. They show.

DESCRIPTION OF SPECIFIC EMBODIMENTS

Figure 1:
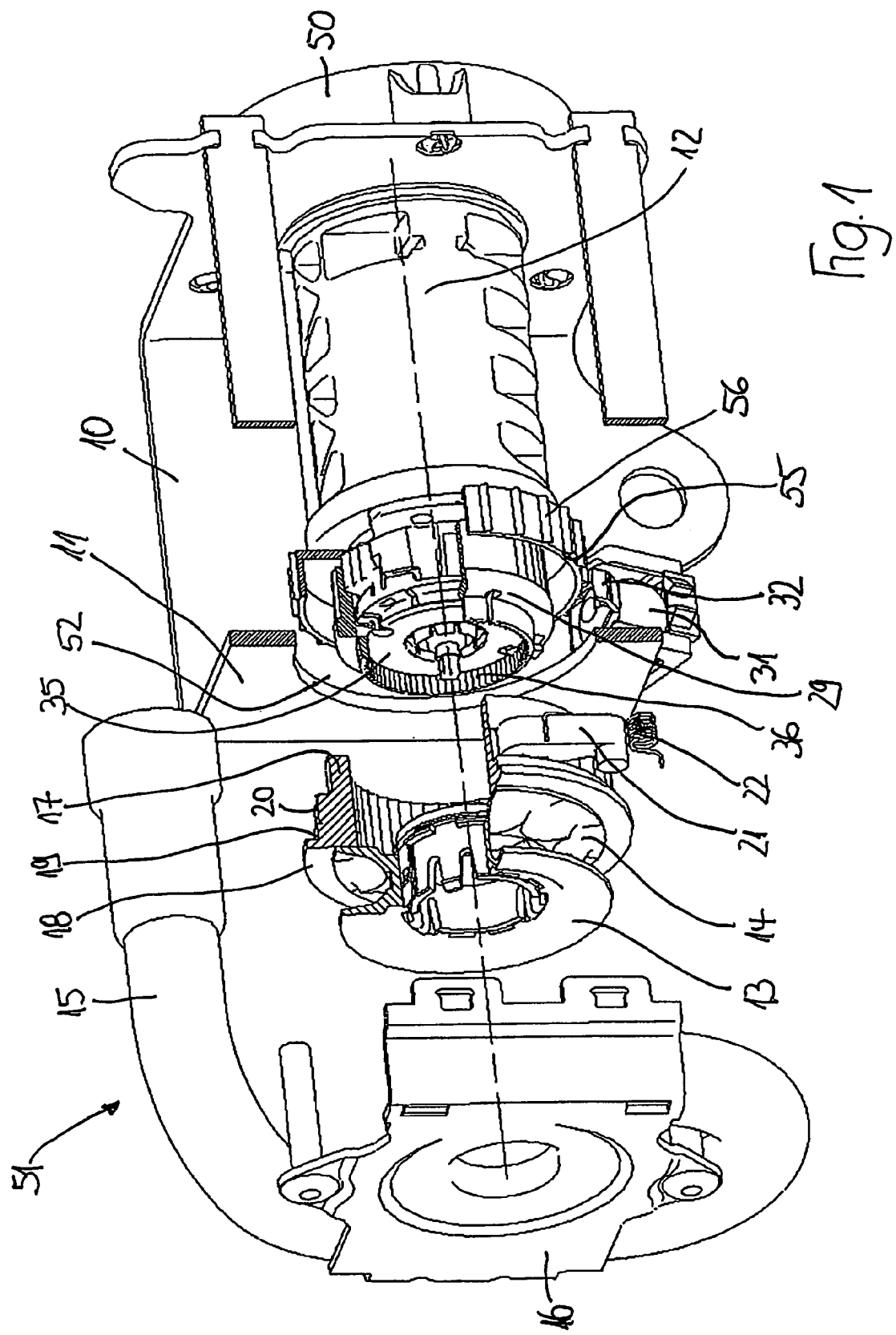
FIG. 1 a seat belt retractor with a tightening device in a total view with a partially exploded component group, FIG. 2 the blocking side of the seat belt retractor with integrated drive wheel in an exploded view, FIG. 3 the subject matter of FIG. 2 as viewed in another viewing direction, FIG. 4 the tightening sensitive control system for the coupling of the belt to the drive wheel in an individual detail illustration, FIG. 5 a shank of the seat belt retractor housing with block levers for securement of the drive wheel, FIG. 6 an arrangement for coupling the block levers of the profile head to the drive wheel in a schematic illustration, FIG. 7 the arrangement according to FIG. 6 with a special, pyrotechnic drive unit, FIG. 8 the arrangement according to FIG. 6, by which the pyrotechnic drive device of the tightening device delivers the drive impulse for the activation of the coupling lever, FIG. 9 another embodiment of the coupling of the stop lever of the profile head to the drive wheel, FIG. 10 the subject matter of FIG. 9 in a sectional side view, FIG. 11 the control system for the coupling of the belt shaft to the drive wheel in accordance with FIG. 1-3 in another embodiment, FIG. 12 the securement of the drive wheel on a housing shank in another embodiment in a schematic illustration, FIG. 13 the securement of the drive wheel on a housing shank in a further embodiment in a schematic illustration, FIG. 14a-l in various embodiments, the respective arrangement to one another of the housing, belt shaft, drive wheel, as well as the blocking- and control-elements in a schematic illustration.

The seat belt retractor illustrated in its totality in FIG. 1 has a U-shaped housing 10 in whose side U-shanks a belt shaft 12 is rotatably mounted; the belt of a not-illustrated seatbelt is wound up onto the belt shaft 12.

While on a side of the belt shaft 12 a windup spring is arranged under a housing cap 50, a drive wheel 13 of a tightening device is arranged on the other side of the belt shaft 12, the drive wheel having a drive device 51 disposed relative thereto for setting the drive wheel 13 into rotation in the event of a release event of the tightening device. The drive device 51 is configured in the illustrated embodiment as a ball tensioner according to DE 196 02 546 A1; to the extent that the drive device in its configuration does not count as part of the subject matter of the invention, a description thereof is to be had by reference to the above-noted publication. Also, other drive devices are possible such as, for example, a drive via a drive cable wound onto the drive wheel. In individual details, the drive device 51 comprises a conduit housing 15, secured to the housing 10 via a securement cap 16, in which a propelling charge as well as balls in the form of inertia bodies are arranged; in a release event, the balls are driven by the gas created by ignition of the gas generator out of the conduit housing 15 so that these balls enter into the cut-outs 14 of the drive wheel 13 and, consequently, set the drive wheel 13 into rotation.

The drive wheel 13 has a projection 17 oriented toward the U-shank 11 of the housing 10, the projection projecting into a support opening 52 configured in the U-shank of the housing 10. In this manner, a bearing flange 18 configured on the projection 17 lies against the outer side of the U-shank 11, while a thereon-connected bearing annulus 19 is arranged in the plane of the bearing opening 52 so that the drive wheel 13 is rotatably supported in the U-shank 11 of the housing 10.

An outer toothed gearing system configured as a blocking toothed gearing system 20 is mounted on the region of the projection 17 that is adjacent the bearing annulus 19 and in front of the belt shaft 12, the outer toothed gearing system having a block lever 21 pivotably arranged on the inner side of the U-shank 11 arranged relative thereto, the block lever being pre-tensioned by a spring 22 into its engagement position with the blocking toothed gearing system 20. In this manner, the toothed gearing systems of the block lever 21 and the blocking toothed gearing system 20 are configured such that a rotation of the drive wheel 13 in the belt retracting direction is continuously blocked and a rotation of the drive wheel 13 in the belt unwinding direction is possible through over-ratcheting of the block lever 21 via the blocking toothed gearing system 20. Additionally, the drive wheel 13 comprises, in the region of its projection 17, an inner toothed gearing system 40 for engaging the blocking means so that the drive wheel 13, which is secured on the housing 10 via the block lever 21, operates as a load receiving, housing-side block for the block system of the seat belt retractor. The components for coupling the drive wheel 13 to the belt shaft 12 are hereinafter described in particular detail.

Figure 5:
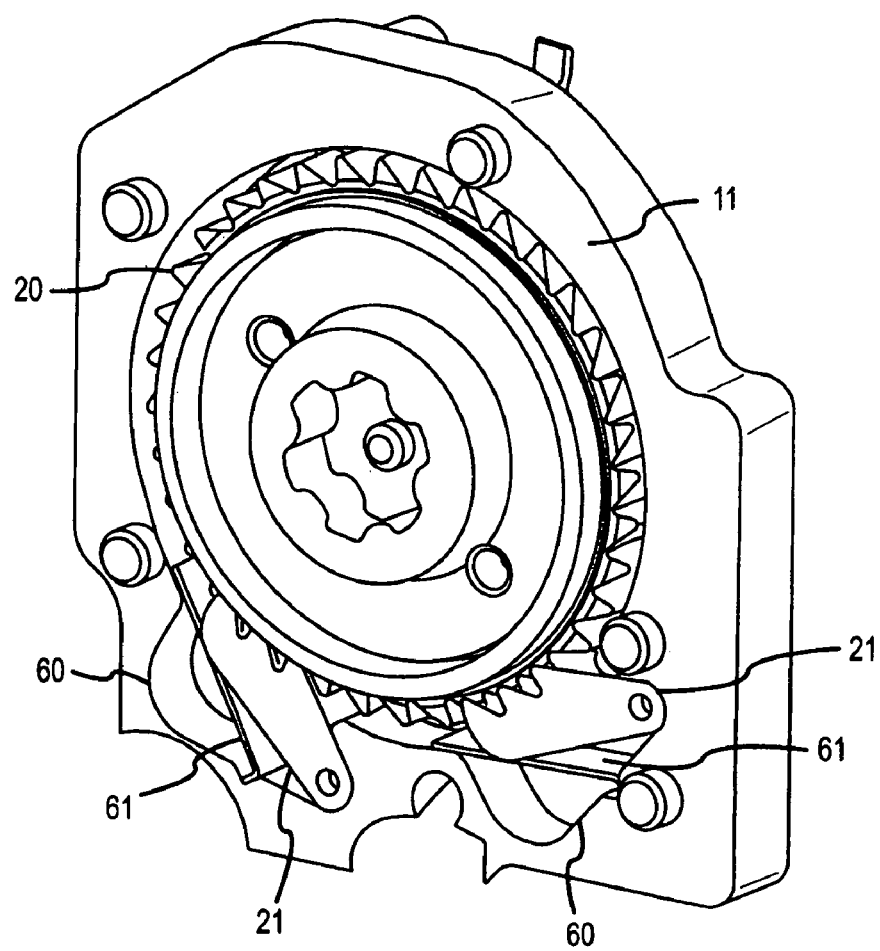

An alternative arrangement of the block levers 21 on the housing shank 11 of the housing 10 is shown in FIG. 5; in this embodiment, two block levers 21 are arranged in the plane of the U-shank 11 of the housing 10 and, in fact, are arranged in the recesses 60 present in the housing shank 11. The spring loading of the block levers 21 is effected via the leaf springs 61 arranged between the respective block levers 21 and the edge of the recess 60. As can be easily seen, a reduction of the configuration width of the seat belt retractor is connected therewith.

Figure 12:
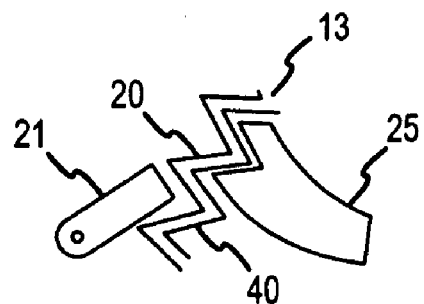
Figure 13:
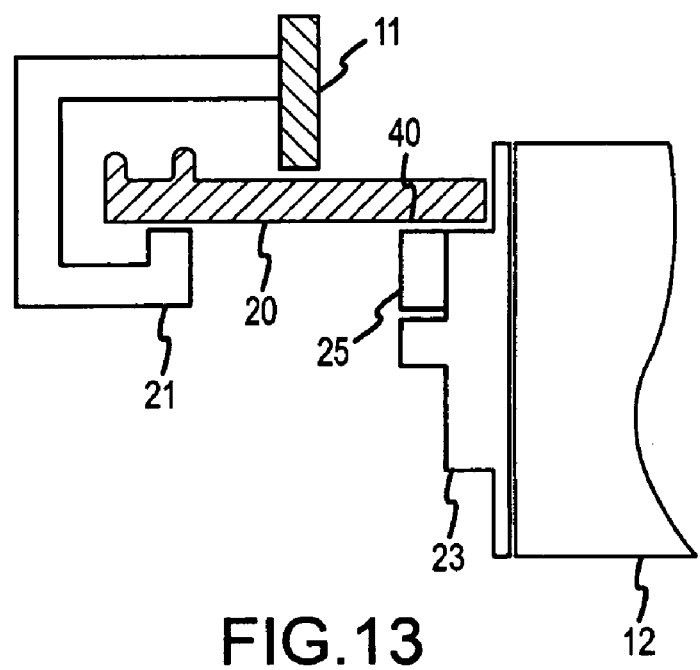

Insofar as concerns the configuration of the toothed gearing systems on the drive wheel for the engagement of the block levers 21, the invention suggests various embodiments. Insofar in accordance with FIG. 1, the outer toothed gearing system 20 and the inner toothed gearing system 40 are arranged in a plane, it is, in accordance with FIG. 12, suggested in an expedient manner to configure these toothed gearing systems 20, 40 in a single production step, in that the outer toothed gearing system 20 is formed via the stamping of the inner toothed gearing system 40 out of the ring profile of the drive wheel 13 so that a total unitary toothed gearing system is produced; this is depicted schematically in FIG. 12.

Figure 2:
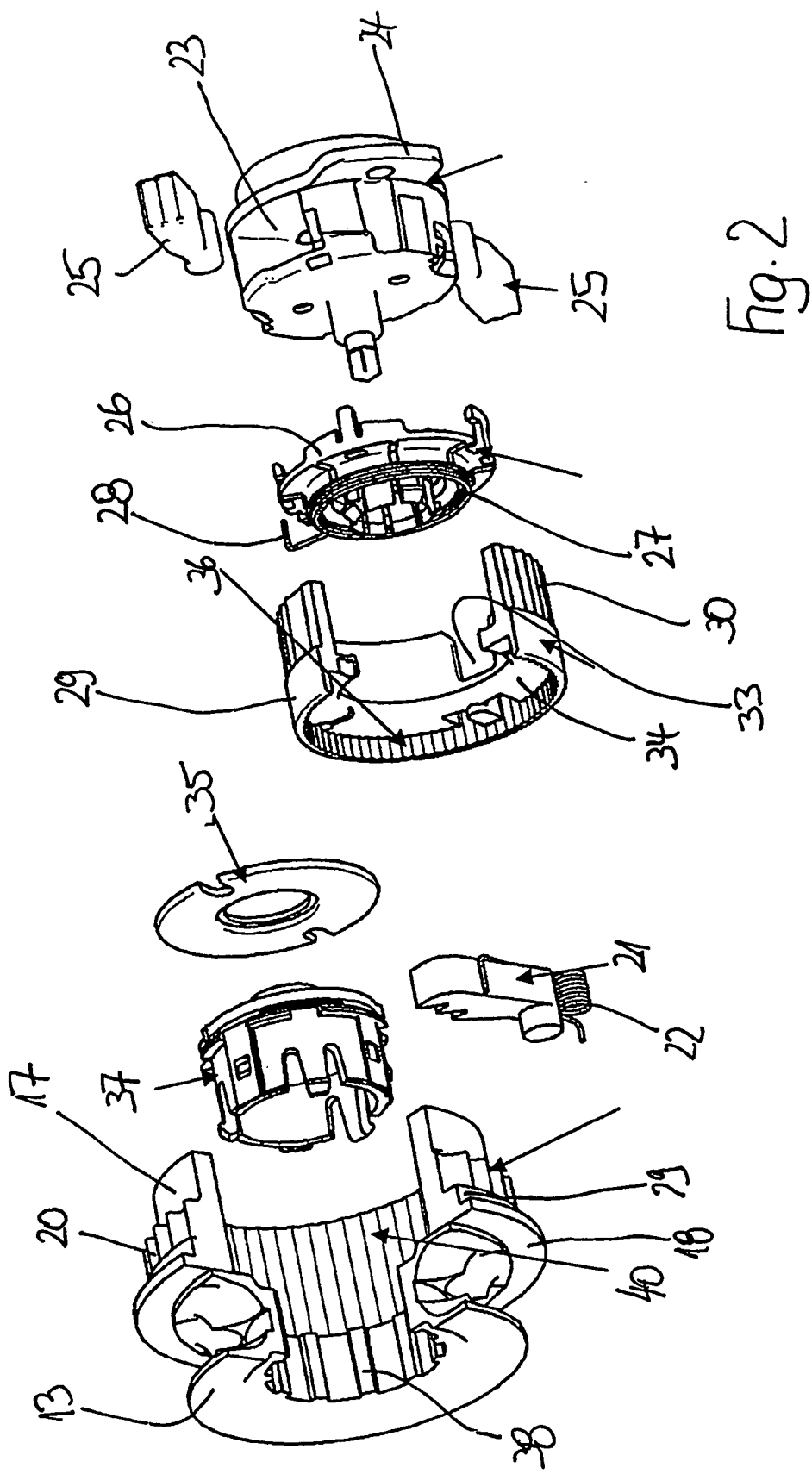
Figure 3:
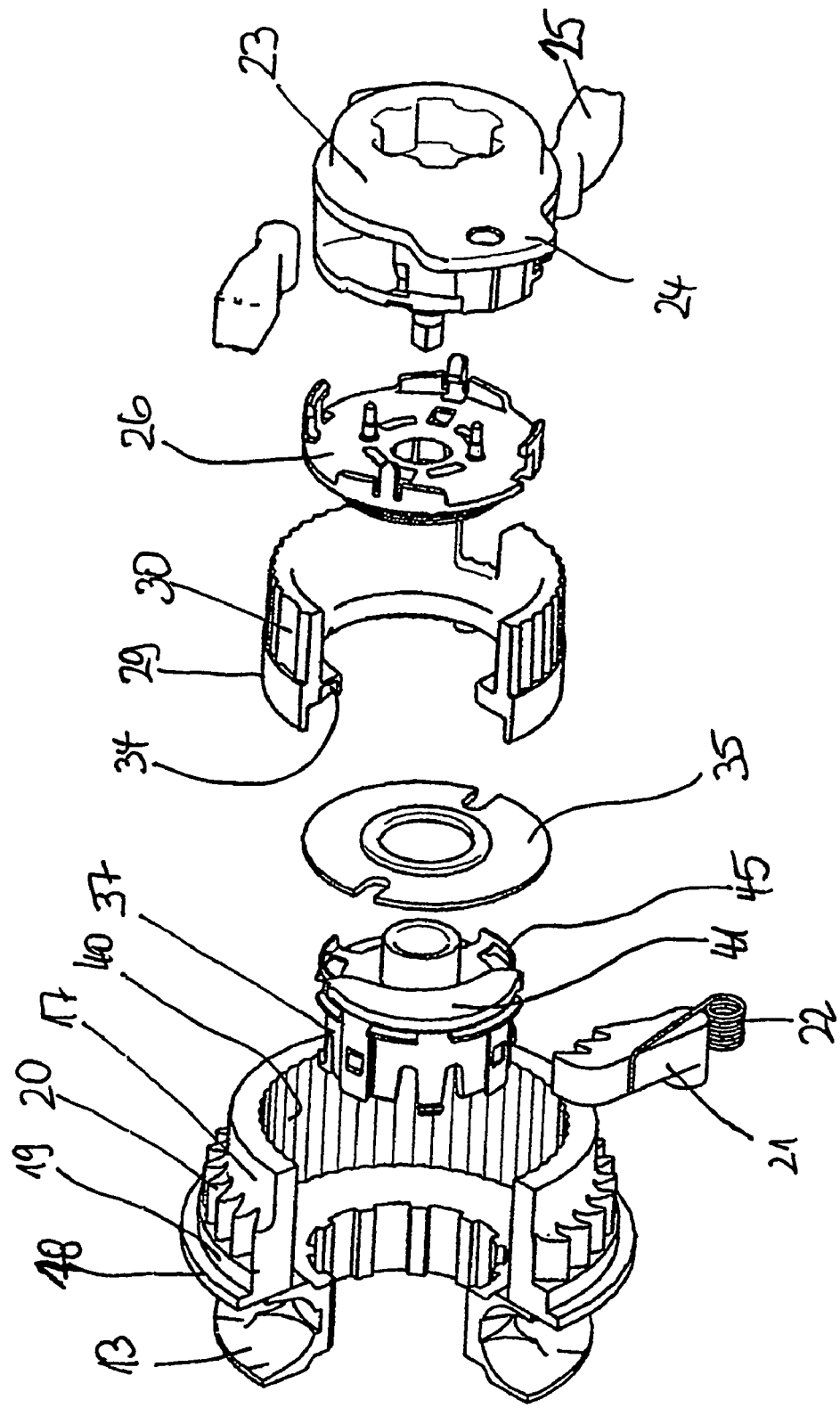
Figure 4:
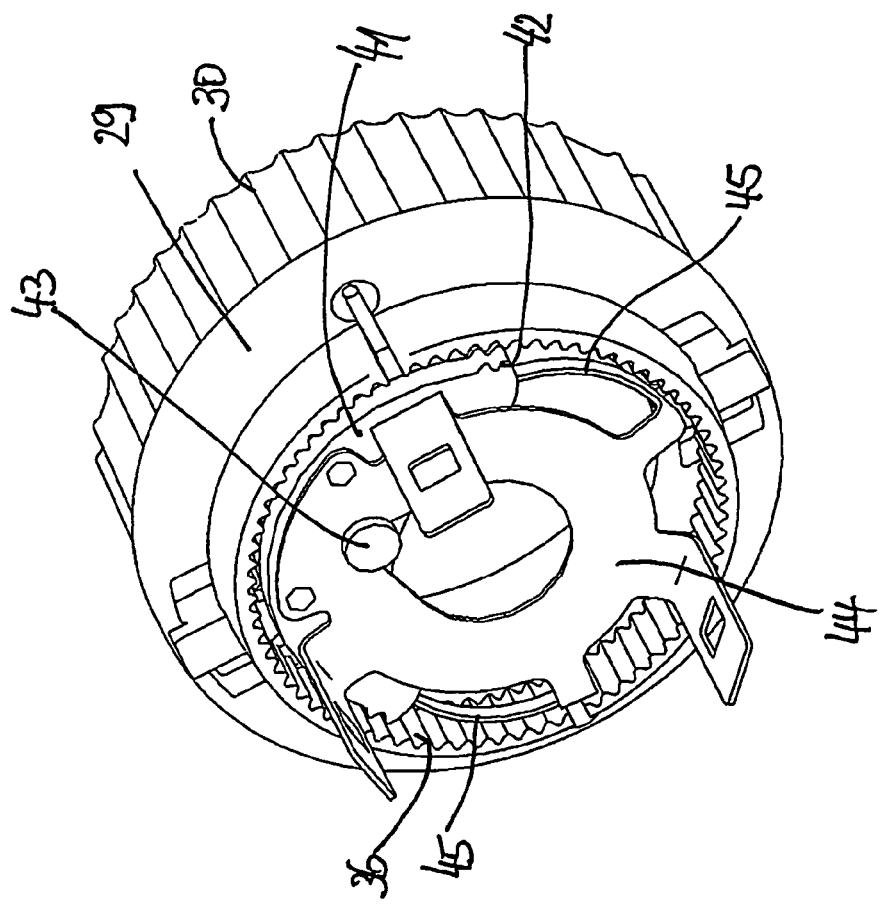

The coupling of the drive wheel 13 to the belt shaft 12 is explained with reference to an embodiment illustrated in FIGS. 2-4. As can be initially seen in FIGS. 2 and 3, a profile head 23 is secured to the rear side of the belt shaft oriented thereto, whereby a fixed connection that is not further illustrated is created between the profile head 23 and the belt shaft 12, and such can be configured directly via the torsion bar so that the belt shaft 12 and the profile head 23 rotate respectively with one another.

To the extent that, in a configuration of a seat belt retractor with a torsion bar as the force limiting device such as is described, for example, in DE 43 31 027 A1, the profile head 23 is connected in a non-rotating manner with the torsion bar extending in the interior of the belt shaft 12 and, to this extent, a relative rotation between the profile head 23 and the belt shaft 12 is possible, push outs 24 radially spaced from one another are provided on the profile head 13, with not-illustrated shear pins, connected with the belt shaft 12, being disposed on the push outs, so that, before a tasking by the torsion bar, the profile head 23 is directly connected with the belt shaft 12. Two radially outwardly pivotable blocking levers configured as blocking means 25 are arranged in opposition to one another on the profile head via which, in a hereinafter described manner, the blocking of the belt shaft 12 relative to the housing 10 is effected.

Insofar as the control of the blocking is, on the one hand, executed via a belt sensitive control system and, on the other hand, executed via a vehicle sensitive control system, the belt sensitive control system comprises an adapter 26 that is to be connected with the profile head 23 via, preferably, a positive notch connection, with a so-called WS spring 27 that determines the tasking level for the belt sensitive control system being secured to the adapter 26. The outer, radially spaced spring end 28 is suspended on the inner side of an inertial mass 29 that is configured in an annular shape and surrounds the profile head 23 with the adapter 26. In order that the stop levers 25 of the profile head 23 can extend radially outwardly, the inertial mass 29 comprises respectively opposed recesses 33 for the extension therethrough of the stop levers 25.

Additionally, a ring 55 is arranged on the outermost circumference of the inertial mass 29, whose outer teeth 56 are engaged by a block arm 32 that is arranged with a vehicle sensor 31 upon tasking by the vehicle sensor and which, thereby, halts the inertial mass 29 in its movement. In this connection, the stop levers 25 are displaced in the block function. The inertial mass 29 is, further, provided with an outer toothed gearing system 30 on its outer side which makes possible an additional blocking of the belt shaft 12, in that the inertial mass blocks upon their side movement into the toothed gearing system 40. It would therefore be alternatively possible, as the occasion arises to permit the stop arm 32 of the vehicle sensor 31 to also directly engage the outer toothed gearing system 30.

As the inertial mass 29 operates not only as a component of the vehicle sensitive and the belt sensitive control systems but, additionally, performs the function in view of the coupling of the drive wheel 13, the inner volume of the ring-shaped inertial mass 29 is partitioned via an inner flange 34. A security plate 35 lies against the inner flange 34, the security plate being disposed in the ring-shaped inertial mass 29 and being notch-engaged with the adapter 26 so that the inertial mass 29 cannot be disassociated therefrom but is, however, relative to the profile head 23 with the adapter 26, secured with the profile head 23 for rotation therewith.

The inertial mass 29 is provided with an inner toothed gearing system 36 in the region thereof which is axially opposed to the security plate 35. A come along part 37, which is secured via a positive connection configuration 38 to the drive wheel 13, projects into this region of the inertial mass 29 provided with the inner toothed gearing system 36, whereby a stop spring 44 is secured to the come along piece 37. A two-armed coupling lever 41 with a centrally arranged crank pin 43 is mounted on the stop spring 44 for radially outward pivoting movement, the coupling lever having, on its outer end, a toothed gearing system 42 that is arranged for engaging the inner toothed gearing system 36 of the inertial mass 29. The coupling lever 41 is held in its inactive position by the spring arms 45 of the stop spring 44 in a manner such that it can freely move relative to the inertial mass 29. In the event, nonetheless, that, upon a tasking by the tightening device there occurs a rotational acceleration of the drive wheel 13 and the therewith associated come along piece 37, the coupling lever 41 remains, due to its inertia, behind the rotational movement of the come along piece 37, whereby the force of the spring arms 45 is overcome so that the coupling lever 41 swings radially into engagement with the inner toothed gearing system 36.

In normal operation of the seat belt retractor with unwinding and winding in of the belt, there occurs, in a known manner, due to the tasking by the belt sensitive or vehicle sensitive control system, a relative rotation of the inertial mass 29 relative to the profile head 23 and, consequently, relative to the belt shaft 12, in that either, upon the tasking by the vehicle sensitive control system, the inertial mass 29 is secured via engagement of the stop arm 32 of the vehicle sensor 31, while the belt shaft 12 further rotates, or in that, upon a rapid unwinding of the belt, the inertial mass 29, due to its inertia, remains behind relative to a rapid rotation of the adapter 26 with the WS spring 27. In both events, the relative movement between the inertial mass 29 and the profile head 23 leads to a radial controlled movement of the stop lever 25 via the cutouts 33 of the inertial mass 29 until engagement of the inner toothed gearing system 40 of the projection 17 of the drive wheel 13. As the drive wheel 13 is secured due to the continuous engagement of the block lever 21 in the blocking toothed gearing system 20 on the housing 10, the belt shaft 12 is prevented from a rotation in the belt retracting direction and the loading that occurs upon further belt unwinding is conducted away via the stop levers 25 and the drive wheel 13 into the seat belt retractor housing 10. The drive wheel 13 is, to this extent, allocated a double function, in that it is also called upon, as well, for configuring the belt blocking.

Insofar as the seat belt retractor comprises a torsion bar as a force limiting device, there occurs, in connection with a belt unwinding loading stemming from the blocked profile head 23 on the belt shaft 12, a shearing off of the shear pins from the push outs 24 of the profile head 23 so that the belt shaft 12 can turn further by virtue of the torsion bar tensioned on the belt shaft 12 and on the profile head 23 in a known manner relative to the blocked profile head 23 during simultaneous force reception through the torsion bar.

If it now occurs that there is a release of the tightening device and, consequently, a rotation of the drive wheel in the belt unwinding direction, there is, initially, the rotation of the drive wheel 13 in the belt unwinding direction is not blocked by the block levers 21 staying in engagement with the blocking toothed gearing system 20 because the toothed gearing system of the blocking toothed gearing system 20 and the spring-loaded block levers 21 are correspondingly configured with one another such that the drive wheel 13 can turn in the belt unwinding direction through over-ratcheting of the block lever 21 via the blocking toothed gearing system 20.

The rotation of the drive wheel 13 leads to a tasking by the coupling lever 41, which is supported via the come along piece 37 on the drive wheel 13, the coupling lever 41, upon corresponding rotational acceleration, being controlled into engagement with the inner toothed gearing system 36 of the inertial mass 29 so that the inertial mass 29 is coupled to the rotation of the drive wheel 13. In this manner, there expediently occurs a relative movement between the rotating inertial mass 29 and the more or less in its inactive position belt shaft 20 with the profile head 23, and this relative movement further leads to a control of the stop levers 25 into engagement with the inner toothed gearing system 40 of the drive wheel 13. As a consequence of this, a load transferring, direct coupling between the drive wheel 13 and the profile head 23 is effected so that there is undertaken at the same time, via the block device of the seat belt retractor, the transfer of the tightening rotation of the drive wheel 13 into a rotation of the belt shaft 12 in the seat belt retractor device.

Alternative embodiments for controlling of the coupling levers that bring about the coupling of the drive wheel 13 to the inertial mass 29 and, consequently, the coupling engagement of the stop levers 25 of the profile head 23 in the inner toothed gearing system 40, are described in connection with FIGS. 6-8.

Figure 6:
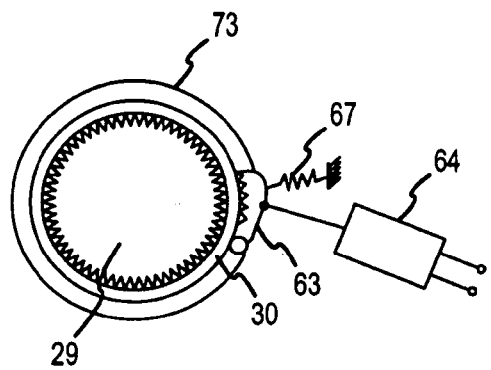

As can initially be seen in FIG. 6, a coupling lever 63 is rotatably mounted on the drive wheel such that the coupling lever can be swung into engagement with the blocking toothed gearing system 30 of the inertial mass 29. This swinging in movement is executed via a schematically illustrated actuator 64 that can be configured, for example, as an electromagnet or a piezo element.

Figure 7:
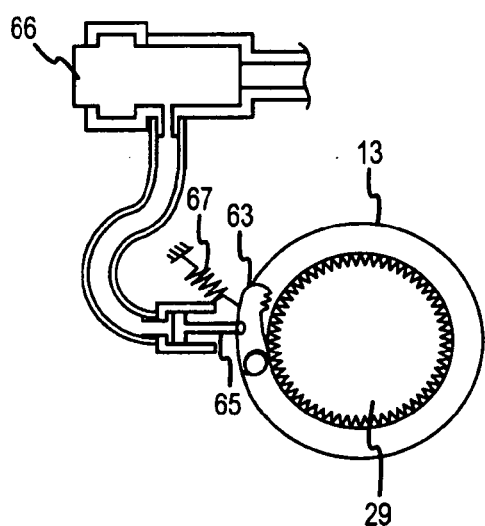

As can be seen in another embodiment in accordance with FIG. 7, the actuator can be configured, as well, as a piston unit 65 engaging the coupling lever 63, the piston unit having a piston rod that engages the coupling lever 63. The piston unit 65 is controlled via a special pyrotechnic drive unit 66 which can be fired in common with the release of the tightening device.

Figure 8:
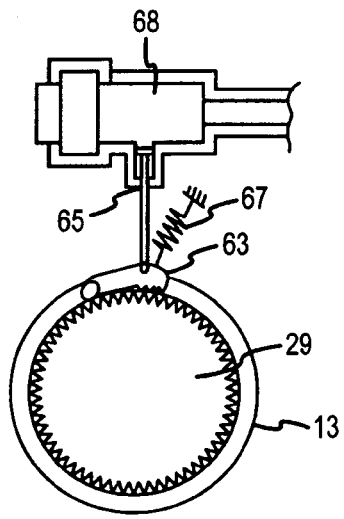

With respect to the embodiment shown in FIG. 8, reference is had to a drive unit 68 for the tightening device for controlling the operation of the piston unit 65 in engaging the coupling lever 63, whereupon, for this purpose, the drive unit 68 is connected via a gas pressure conduit 69 with the piston unit 65. Upon the release of the drive unit 68, not only the drive device 51 of the tightening device is impinged with gas but, as well, a portion of the produced gas is branched off and led via the gas pressure conduit 69 to the piston unit 65 so that the coupling lever 63 can correspondingly be controlled into engagement with the inertial mass 29.

Figure 11:
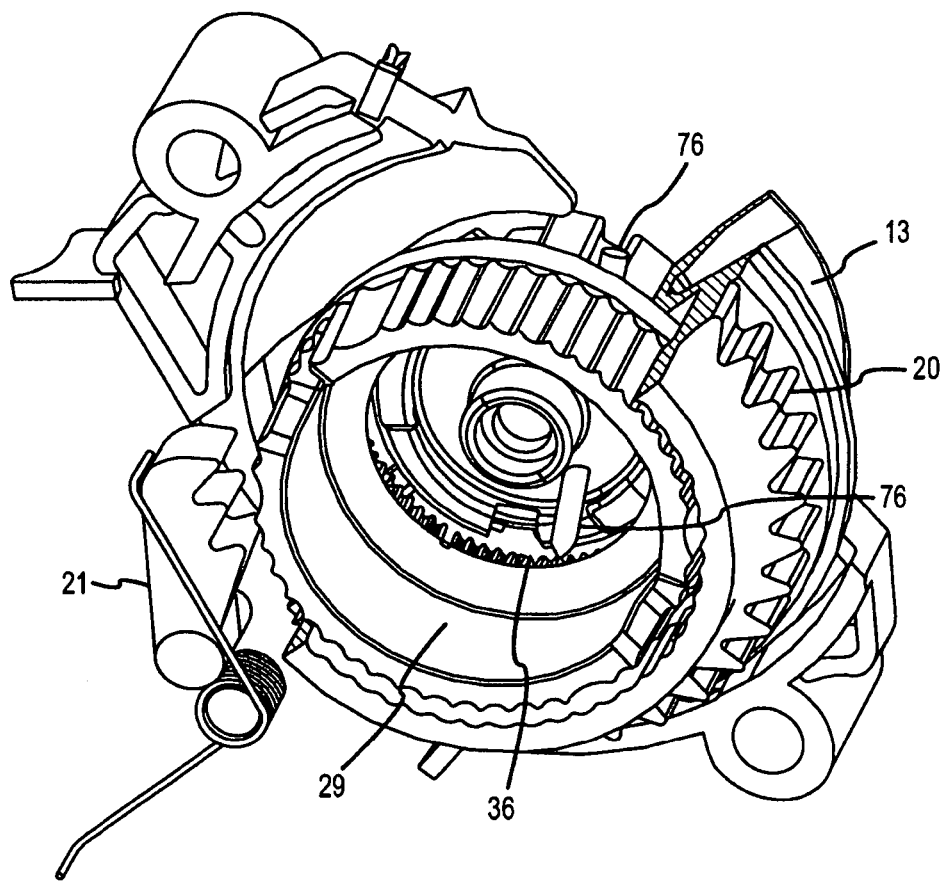

A further embodiment for coupling the drive wheel 13 to the inertial mass 29 is shown in FIG. 11, whereby, here, a longitudinally displaceable pin 76 is arranged on the drive wheel 13 such that the pin 76 extends into the path of the drive balls of the tightening device and is longitudinally displaced by the first-appearing ball and, in connection with this longitudinal displacement, is moved into engagement with the inner toothed gearing system 36 of the inertial mass 29 and, consequently, couples the drive wheel 13 and the inertial mass 29 to one another.

Figure 9:
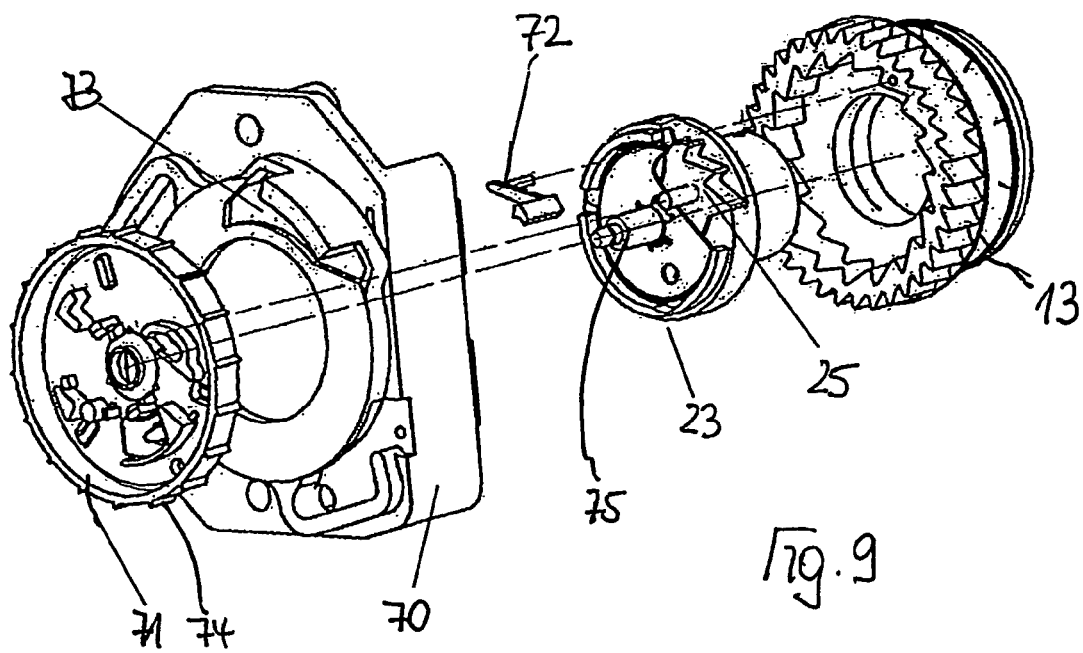
Figure 10:
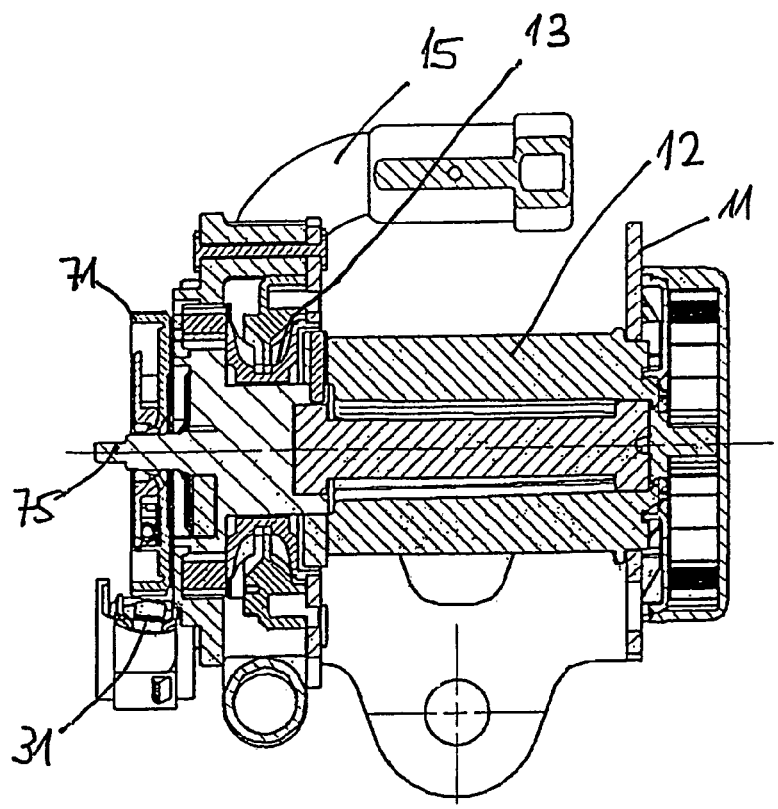

A further alternative embodiment for connecting the drive wheel 13 and the belt shaft 12 is illustrated in FIGS. 9 and 10, whereby, in connection with this embodiment, no pot-shaped inertial mass is provided. In this embodiment there is a U-shaped housing cap 70 that grips around the drive wheel 13 arranged on the U-shank 11 of the housing 10, the outer side of such housing cap having disposed thereat an inertia-controlled control disk 71 mounted on a belt shaft projection 75 extending through the housing cap 70. The control plate 71 comprises, on its outer circumference, a locking toothed gearing system 74 that can be arranged relative to a vehicle sensitive sensor. A come along lever 72 is pivotably mounted on the drive wheel 13, the come along lever extending through a slot guide 73 configured in the housing cap 70 and being oriented for engagement with the blocking toothed gearing system 74 of the control plate 71. The guide slot 73 is configured such that, upon the beginning rotation of the drive wheel 13, the come along lever 72 is brought, via the secured guide slot 73, into engagement with the blocking toothed gearing system 74 of the control plate 71 and the control plate 71 thereby, via its rotation, effects corresponding rotation of the drive wheel 13. In this connection, there occurs a relative rotation of the control plate 71 and the profile head 23 which—as described—leads to a control of the stop levers 25. At the end of this control path, the come along lever 72 contacts the end of the guide slot 73 so that, at this position, the come along lever 72 is sheared off and, consequently, the coupling of the drive wheel 13 to the control plate 71 is again ceased; this coupling is, during the transfer of the tightening movement after the engagement of the stop levers 25 in the inner toothed gearing system 40 of the drive wheel 13, no longer required.

Different possibilities are shown in FIGS. 14a-l for the components of the seat belt retractor necessary for its configuration such as the housing, belt shaft, drive wheel, as well as the blocking and control elements that can be arranged in various positions relative to one another; from this, it is clear that the invention is usable in all conceivable, configuration-dictated arrangements of the individual parts of a seat belt retractor and is not limited in their usage.

Figure 14A:
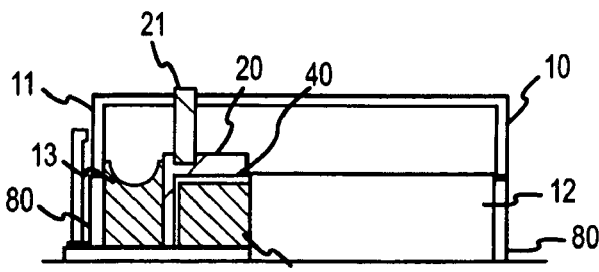

FIG. 14a shows, initially, in a schematic illustration, an arrangement in which the tightening gear 13 with a bearing location 80 for the belt shaft 12 is disposed interiorly of a housing shank 11 of the U-shaped housing 10, whereby the outer toothed gearing system 20 for connection of the housing side-mounted block lever 21 and the inner toothed gearing system 40 for engagement of the belt blocking (profile head 23, stop levers 25) are oriented toward the belt shaft 12.

Figure 14B:
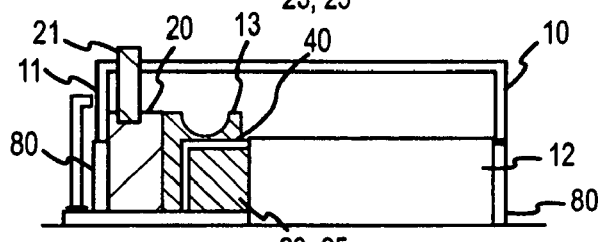

The embodiment shown in FIG. 14b differs in that the outer toothed gearing system 20 with the block levers 21 and the inner toothed gearing system 40 with the belt blocking 23, 25 are disposed on different sides of the drive wheel 13, whereby the drive wheel is arranged to meshingly engage the inner toothed gearing system 40 in order to thereby save on the axial component length.

Figure 14C:
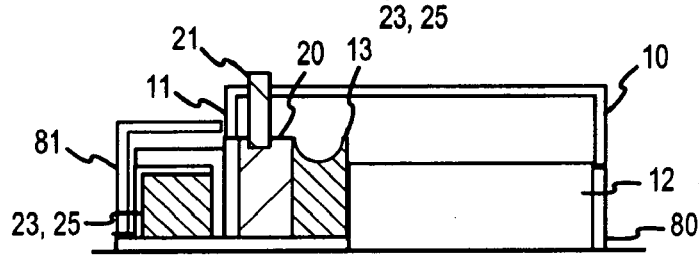

The embodiment illustrated in FIG. 14c is that of a seat belt retractor similar to that shown in the illustration in FIG. 14a, whereby the drive wheel 13 is arranged interiorly adjacent the belt shaft 12 and the toothed gearing systems 20, 40 are configured outwardly; in this connection, a blocking abutment is created.

Figure 14D:
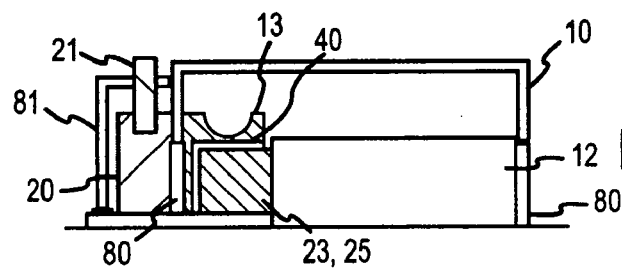

The embodiment shown in FIG. 14d is similar to that shown in FIG. 14b, whereby, now, the drive wheel 13 with inner toothed gearing system 40 and the outer toothed gearing system 20 with block levers 21 are arranged on different sides of the housing shank 11, whereby the drive wheel 13 is interiorly of the housing shank 11. An additional house component 81 configured as an abutment for the stop lever 21 is provided on the U-shank 11 of the housing.

Figure 14E:
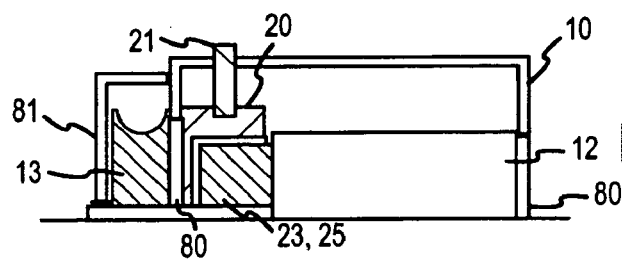

The embodiment shown in FIG. 14e essentially shows an inversion of the embodiment shown in FIG. 14d, whereby, now, the drive wheel 13 is arranged exteriorly of the housing shank 11 and the toothed gearing systems 40, 20 of the drive wheel 13, which lie in a plane, are arranged between the housing shank 11 and the belt shaft 12.

Figure 14F:
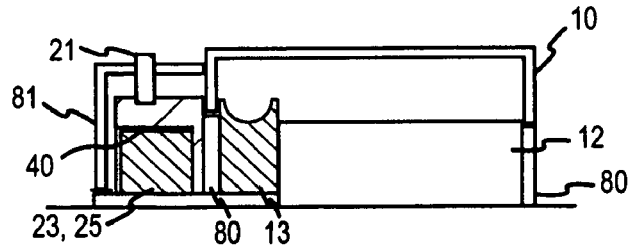

The embodiment shown in FIG. 14f corresponds to the embodiment illustrated in FIG. 14e, whereby an exchange of the construction elements from the interior to the exterior is undertaken, in that the drive wheel 13 is arranged between the housing shank 11 and the belt shaft 12 and the remaining elements are arranged exteriorly of the housing 10. The block lever 21 is, in accordance with FIG. 14d, again supported against an additional housing component 81.

Figure 14G:
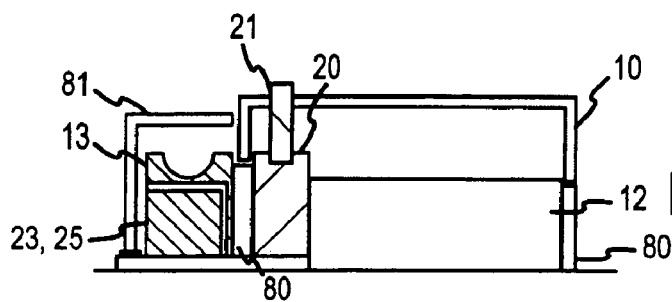
Figure 14H:
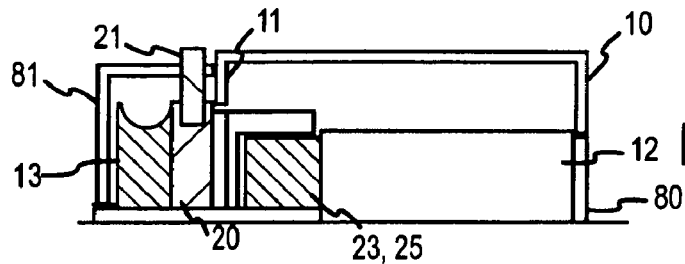
Figure 14I:
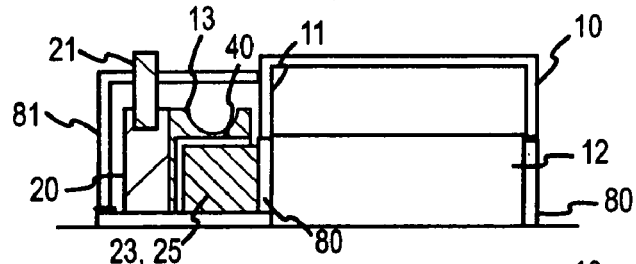
Figure 14J:
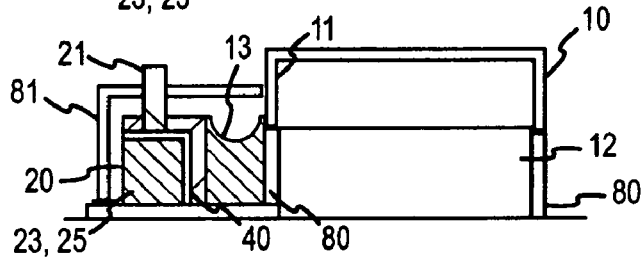

The embodiment illustrated in FIG. 14g corresponds to that shown in 14e with the measure that the outer toothed gearing system 20 with the blocking lever 21 is arranged between the housing shank 11 and the belt shaft 12, while the drive wheel 13 with the thereto connected inner toothed gearing system 40 with the belt blocking 23, 25 is arranged exteriorly of the housing 10.

In the hereinafter following still-to-be described embodiments according to FIGS. 14h-14l, there is, in addition to the U-shaped housing 10, as has already been described in connection with FIGS. 14d, and 14f, an additional housing component 81 on a U-shank 11 of the housing that operates as an abutment for the stop lever 21 so that, respectively, the stop lever 21 is mounted on this additional housing component 81. In this connection, in the embodiment in accordance with FIG. 14h, there is shown an inversion of the arrangement shown in FIG. 14c, whereby the belt blocking 23, 25 are arranged within the housing 10 and the remaining construction components are arranged exteriorly of the housing 10.

In the embodiment illustrated in Figure i, an embodiment identical to that shown in FIG. 14b has been selected, whereby the corresponding elements of the drive wheel 13 with the associated blocking elements are arranged exteriorly of the housing 10.

The embodiment shown in FIG. 14j corresponds once again to the embodiment shown in FIG. 14a with a side-inverted arrangement of the construction elements, such being collectively disposed exteriorly of the housing 10.

Figure 14K:
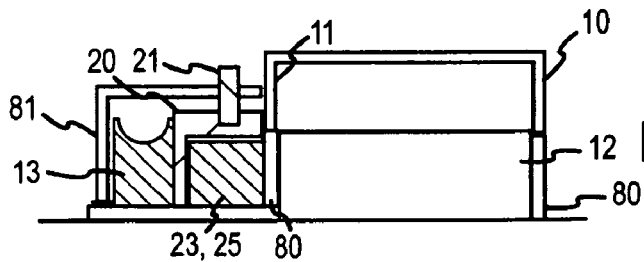
Figure 14L:
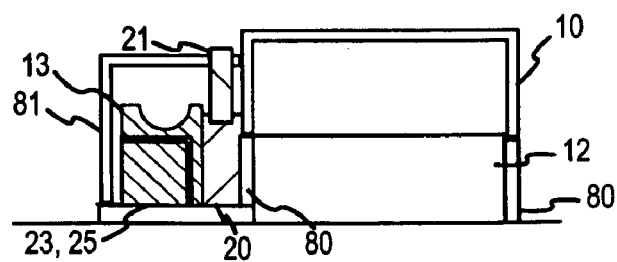

The foregoing corresponds as well for the embodiments shown in FIGS. 14k and 14l, such illustrations showing, in a manner analogous to the above description, alternative arrangements.

The features of the subject matter of this case as set forth in the herein above description, the patent claims, the summary, and the drawings, can be important individually or in desired combinations with one another in order to realize the invention in its various forms.

The specification incorporates by reference the disclosure of PCT/EP03/03271 filed 28 Mar. 2003 and German Patent Application 102 13 906.7 filed 28 Mar. 2002.

The present invention is, of course, in no way restricted to the specific disclosure of the specification and drawings, but also encompasses any modifications within the scope of the appended claims.

The invention claimed is:

1. A self stopping seat belt retractor, comprising:
a belt shaft (12) for winding a seat belt thereonto and unwinding a wound seat belt therefrom;
a housing (10) rotatably supporting the belt shaft (12) and having a blocking device (23) that includes at least one blocking means (25) for the belt shaft (12) that can be controlled in a vehicle sensitive and/or belt sensitive manner into engagement with a toothed gearing system on the side of the housing and having at least one block lever (21);
a drive device (51); and
a tightening device releasable upon the occurrence of a specified event to initiate blocking of the belt shaft (12) against further rotation thereof in the seat belt unwinding direction, the tightening device operating on the belt shaft (12) and including a drive wheel (13) that can be set into rotation via the drive device (51), the drive wheel being connectable upon release of the tightening device with the belt shaft (12), whereby the drive wheel (13) of the tightening device is connectable via the blocking device (23) with the belt shaft (12) for the transmission of force to the belt shaft and the drive wheel (13) is, prior to the release of the tightening device, secured in a force-transmitting manner on the housing (10) of the seat belt retractor, the drive wheel (13) having an inner toothed gearing system (40) that is oriented for engagement by the blocking means (25) of the blocking device (23) secured on the belt shaft (12) and that operates as a blocking toothed gearing system and an outer toothed gearing system (20) for engagement with the at least one block lever (21) on the housing (10) that is maintained, via yielding under the bias of a spring, in engagement with the outer toothed gearing system (20), whereby, via the rotation of the drive wheel (13) that is effected by the release of the tightening device, the drive wheel (13) is releasable from the housing (10) and is connectable with the belt shaft (12) in a force-transmitting manner via the blocking means (25) of the blocking device, and wherein the drive wheel (13) is directly connectable with the belt shaft (12) via the blocking means (25) of the blocking device (23).

2. A seat belt retractor according to claim 1, wherein the outer toothed gearing system (20) of the drive wheel (13) and the block lever (21) are configured relative to each other such that a rotation of the drive wheel (13) in the belt retracting direction is continuously blocked and a rotation of the drive wheel (13) in the belt unwinding direction is possible through over-ratcheting of the block lever (21) via the blocking toothed gearing system (20) of the drive wheel (13).

3. A seat belt retractor according to claim 1, wherein the blocking device (23) for the belt shaft (12) comprises, in addition to the blocking means (25) effective for blocking the belt shaft (12), a lever mounted on the blocking device (23) and activatable by the drive wheel (13) for coupling the drive wheel (13) to the blocking device (23).

4. A seat belt retractor according to claim 1, wherein the housing (10) includes a U-shank (11) and the block lever (21) is arranged adjacent the U-shank (11) of the housing (10) and is pivotably mounted on the U-shank (11) subject to a pretension applied by a rotation spring (22).

5. A seat belt retractor according to claim 1, wherein several block levers (21) are mounted on the housing (10) of the seat belt retractor on the circumference of the drive wheel (13).

6. A seat belt retractor according to claim 1, wherein the outer toothed gearing system (20) and the inner toothed gearing system (40) of the drive wheel (13) are arranged in a plane.

7. A seat belt retractor according to claim 1, wherein the outside toothed gearing system (20) and the inner toothed gearing system (40) are, via forming of the teeth of the inside toothed gearing system (40) out of the ring profile of the drive wheel (13), configured in a manner such that the outside toothed gearing system (20) and the inside toothed gearing system (40) form a toothed gearing system with unitary teeth.

8. A seat belt retractor according to claim 1, wherein the drive wheel (13) is secured on the housing (10) via a blocking means that is capable of being destroyed when subject to loading and the drive device (51) of the tightening device is configured such that, after the conclusion of the drive movement, a return movement of the drive device (51) in the belt unwinding direction is foreclosed such that the drive wheel (13) is held in a non-rotating position via the drive device (51) that is blocked and functions as the blocking toothed gearing system.

9. A seat belt retractor according to claim 1, and further comprising a control element (63, 72, 41, 76) that is released by the tightening device for coupling the blocking means (25) of the blocking device (23) to the drive wheel.

10. A seat belt retractor according to claim 1, wherein, for a vehicle sensitive control of the blocking device (23), an inertial mass (29) that grips around the blocking device is provided whose relative movement with respect to the rotational movement of the belt shaft (12) controls the blocking means (25) into engagement with the drive wheel (13).

11. A seat belt retractor according to claim 1, and further comprising an inertial mass (29) arranged relative to a blocking toothed gearing system (30) with which a sensor lever (31) of a vehicle sensitive sensor (30) can be brought into engagement.

12. A seat belt retractor according to claim 1, wherein the drive wheel (13) with its blocking toothed gearing system (20) is mounted on the outer side of a U-shank (11) of the housing (10) of the seat belt retractor and the block lever (21) is mounted on the outer side of the shank (11).

13. A seat belt retractor according to claim 1, wherein the housing (10) includes a U-shaped shank (11), the drive wheel (13) is arranged with its region that engages the drive device (51) on the outside of the U-shank (11) and extends through the U-shank (11) via a support opening (52) therein with a projection (17) that supports the outer toothed gearing system (20), and the outer toothed gearing system (20) is mounted on the inner side of the U-shank (11).

14. A seat belt retractor according to claim 4, wherein the block lever (21) is arranged in the plane of the U-shank (11) in a recess (60) formed thereon and is pivotably mounted in the recess (60), whereby a leaf spring (61) is arranged between the block lever (21) and the edge of the recess.

15. A seat belt retractor according to claim 9, further comprising an inertial mass (29) is arranged relative to a blocking toothed gearing system (30) with which a sensor lever (31) of a vehicle sensitive sensor (30) can be brought into engagement and the control element is a coupling lever (63) that can be controlled into engagement with the blocking toothed gearing system (30) of the inertial mass (29).

16. A seat belt retractor according to claim 9, wherein the control element is formed as a come along lever (72) mounted on the drive wheel (13) and guided in a constrained manner by a housing piece (70), the come along lever being constrained into engagement with the blocking toothed gearing system (74) of a control plate (71) of the block means (25) upon rotation of the drive wheel (13) and thereafter moving out of engagement with the control plate (71) in connection with the blocking of the block means (25) with the drive wheel (13) effected via the control plate (71).

17. A seat belt retractor according to claim 9, wherein the control element is a coupling lever (41) that is rotatably mounted on a come along lever (37) that extends into a pot-shaped inertial mass (29) and is connected with the drive wheel (13), the coupling lever being controllable into engagement with an inner toothed gearing system (36) configured on the inside of the pot-shaped inertial mass (29).

18. A seat belt retractor according to claim 9, and further comprising an inertial mass (29) arranged relative to a blocking toothed gearing system (30) with which a sensor lever (31) of a vehicle sensitive sensor (30) can be brought into engagement and the control element is a coupling member (76) that is controllable into engagement with an inner toothed gearing system (36) of the inertial mass (29) by the drive device (51) of the tightening device upon the movement of the drive device to begin its rotation.

19. A seat belt retractor according to claim 15, wherein the coupling lever (63) can be controlled, upon release of the tightening device, into engagement with the blocking toothed gearing system (30) of the inertial mass (29) by means of a special lever actuator.

20. A seat belt retractor according to claim 15, wherein the lever actuator is an actuator (64) operative to move the coupling lever (63).

21. A seat belt retractor according to claim 20, wherein the actuator (64) is an electro-magnet, a piezo element, or a pyrotechnically driven piston unit (65).

22. A seat belt retractor according to claim 21, wherein when the actuator is a piston unit, to actuate the piston unit (65), a special pyrotechnic drive unit (66) is provided.

23. A seat belt retractor according to claim 21, wherein when the actuator is a piston unit, the piston unit (65) is connected to the pyrotechnic drive unit (68) of the tightening device and is impacted thereby.

24. A seat belt retractor according to claim 16, wherein the control plate (71) is disposed, on the outer side of a housing cap (70) that grips around the drive wheel (13), on a belt shaft projection (75) of the belt shaft and a guide slot (73) is configured in the housing cap (70) for constrained guiding of the come along lever (72) that extends through the housing cap (70).

25. A seat belt retractor according to claim 24, wherein the guide slot (73) is configured such that the come along lever (72) is sheared off after the conclusion of the controlled engagement, effected via the relative rotation of the control plate (71) with respect to the profile head (23), of the stop lever (25) with the inside toothed gearing system (40) of the drive wheel (13).

26. A seal belt retractor according to claim 17, wherein the coupling lever (41) is pivotably disposed on a spring element (44) secured on the come-along piece (37).

27. A seat belt retractor according to claim 17, wherein the spring element (44) comprises at least one spring arm (45) that secures the coupling lever (41) in its inactive position.

28. A seat belt retractor according to claim 18, wherein the coupling member is comprised of a longitudinally displaceable pin (76) arranged on the drive wheel (13) that is longitudinally displaceable by the drive device (51), the pin (76), via its longitudinal displacement, being moved into engagement with the inner toothed gearing system (36) of the inertial mass 29.

29. A seat belt retractor according to claim 13, wherein the projection (17) extending through the U-shank (11) of the housing (10) forms the rotational support for the rotation of the drive wheel (13).

30. A self stopping seat belt retractor, comprising:
a belt shaft (12) for winding a seat belt thereonto and unwinding a wound seat belt therefrom;
a housing (10) rotatably supporting the belt shaft (12) and having a blocking device (23) that includes at least one blocking means (25) for the belt shaft (12) that can be controlled in a vehicle sensitive and/or belt sensitive manner into engagement with a toothed gearing system on the side of the housing and having at least one block lever (21);
a drive device (51);
a tightening device releasable upon the occurrence of a specified event to initiate blocking of the belt shaft (12) against further rotation thereof in the seat belt unwinding direction, the tightening device operating on the belt shaft (12) and including a drive wheel (13) that can be set into rotation via the drive device (51), the drive wheel being connectable upon release of the tightening device with the belt shaft (12), whereby the drive wheel (13) of the tightening device is connectable via a blocking device (23) with the belt shaft (12) for the transmission of force to the belt shaft and the drive wheel (13) is, prior to the release of the tightening device, secured in a force-transmitting manner on the housing (10) of the seat belt retractor, the drive wheel (13) having an inner toothed gearing system (40) that is oriented for engagement by the blocking means (25) of the blocking device (23) secured on the belt shaft (12) and that operates as a blocking toothed gearing system and an outer toothed gearing system (20) for engagement with the at least one block lever (21) on the housing (10) that is maintained, via yielding under the bias of a spring, in engagement with the outer toothed gearing system (20), whereby, via the rotation of the drive wheel (13) that is effected by the release of the tightening device, the drive wheel (13) is releasable from the housing (10) and is connectable with the belt shaft (12) in a force-transmitting manner via the blocking means (25) of the blocking device;

an inertial mass (29); and a force limiting device in the form of a torsion bar connected, on one side, with the belt shaft (12) and supporting, on the other side, the blocking means (25) of the blocking device (23), the torsion bar including a profile head (23) that is gripped around by the inertial mass (29) and that supports the blocking means (25).

31. A seat belt retractor according to claim 30, wherein the profile head (23) is connected with the belt shaft (12) via a special connecting means.

32. A self stopping seat belt retractor, comprising:

a belt shaft (12) for winding a seat belt thereonto and unwinding a wound seat belt therefrom;

a housing (10) rotatably supporting the belt shaft (12) and having a blocking device (23) that includes at least one blocking means (25) for the belt shaft (12) that can be controlled in a vehicle sensitive and/or belt sensitive manner into engagement with a toothed gearing system on the side of the housing and having at least one block lever (21);

a drive device (51); and a tightening device releasable upon the occurrence of a specified event to initiate blocking of the belt shaft (12) against further rotation thereof in the seat belt unwinding direction, the tightening device operating on the belt shaft (12) and including a drive wheel (13) that can be set into rotation via the drive device (51), the drive wheel being connectable upon release of the tightening device with the belt shaft (12), whereby the drive wheel (13) of the tightening device is connectable via the blocking device (23) with the belt shaft (12) for the transmission of force to the belt shaft and the drive wheel (13) is, prior to the release of the tightening device, secured in a force-transmitting manner on the housing (10) of the seat belt retractor, the drive wheel (13) having an inner toothed gearing system (40) that is oriented for engagement by the blocking means (25) of the blocking device (23) secured on the belt shaft (12) and that operates as a blocking toothed gearing system and an outer toothed gearing system (20) for engagement with the at least one block lever (21) on the housing (10) that is maintained, via yielding under the bias of a spring, in engagement with the outer toothed gearing system (20), whereby, via the rotation of the drive wheel (13) that is effected by the release of the tightening device, the drive wheel (13) is releasable from the housing (10) and is connectable with the belt shaft (12) in a force-transmitting manner via the blocking means (25) of the blocking device, wherein the blocking device (23) for the belt shaft (12) comprises, in addition to the blocking means (25) effective for blocking the belt shaft (12), a lever mounted on the blocking device (23) and activatable by the drive wheel (13) for coupling the drive wheel (13) to the blocking device (23).

33. A self stopping seat belt retractor, comprising:

a belt shaft (12) for winding a seat belt thereonto and unwinding a wound seat belt therefrom;

a housing (10) rotatably supporting the belt shaft (12) and having a blocking device (23) that includes at least one blocking means (25) for the belt shaft (12) that can be controlled in a vehicle sensitive and/or belt sensitive manner into engagement with a toothed gearing system on the side of the housing and having at least one block lever (21);

a drive device (51); and a tightening device releasable upon the occurrence of a specified event to initiate blocking of the belt shaft (12) against further rotation thereof in the seat belt unwinding direction, the tightening device operating on the belt shaft (12) and including a drive wheel (13) that can be set into rotation via the drive device (51), the drive wheel being connectable upon release of the tightening device with the belt shaft (12), whereby the drive wheel (13) of the tightening device is connectable via the blocking device (23) with the belt shaft (12) for the transmission of force to the belt shaft and the drive wheel (13) is, prior to the release of the tightening device, secured in a force-transmitting manner on the housing (10) of the seat belt retractor, the drive wheel (13) having an inner toothed gearing system (40) that is oriented for engagement by the blocking means (25) of the blocking device (23) secured on the belt shaft (12) and that operates as a blocking toothed gearing system and an outer toothed gearing system (20) for engagement with the at least one block lever (21) on the housing (10) that is maintained, via yielding under the bias of a spring, in engagement with the outer toothed gearing system (20), whereby, via the rotation of the drive wheel (13) that is effected by the release of the tightening device, the drive wheel (13) is releasable from the housing (10) and is connectable with the bell shaft (12) in a force-transmitting manner via the blocking means (25) of the blocking device, and further comprising a control element (63,72,41,76) that is released by the tightening device for coupling the blocking means (25) of the blocking device (23) to the drive wheel.

* * * * *